United States Patent
Collins et al.

(10) Patent No.: US 7,582,843 B2
(45) Date of Patent: Sep. 1, 2009

(54) METHOD FOR PRODUCING A VARIABLE FLOW OF MELTED MATERIAL AND ARTICLES THEREFROM

(75) Inventors: David Collins, Saline, MI (US); Allen Roche, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 11/162,508

(22) Filed: Sep. 13, 2005

(65) Prior Publication Data

US 2007/0056933 A1      Mar. 15, 2007

(51) Int. Cl.
B23K 9/04      (2006.01)
(52) U.S. Cl. .................................... 219/76.14
(58) Field of Classification Search ............... 219/76.14, 219/76.15, 76.1, 137 R
See application file for complete search history.

(56) References Cited

U.S. PATENT DOCUMENTS

| | | | | |
|---|---|---|---|---|
| 2,938,107 A | * | 5/1960 | Pease | 219/137.71 |
| 4,492,337 A | * | 1/1985 | Harrington et al. | 239/81 |
| 4,521,664 A | * | 6/1985 | Miller | 219/76.14 |
| 5,791,560 A | * | 8/1998 | Rogers et al. | 239/8 |
| 6,001,426 A | * | 12/1999 | Witherspoon et al. | 427/449 |
| 6,007,426 A | * | 12/1999 | Kelly et al. | 463/16 |
| 6,091,043 A | * | 7/2000 | White et al. | 219/76.14 |
| 6,337,455 B1 | * | 1/2002 | Yamaguchi | 219/76.14 |
| 6,683,271 B2 | * | 1/2004 | Rogers | 219/76.14 |
| 6,686,557 B1 | | 2/2004 | Chancey et al. | |
| 6,805,949 B1 | | 10/2004 | Roche et al. | |
| 2004/0084169 A1 | | 5/2004 | Roche et al. | |

FOREIGN PATENT DOCUMENTS

| | | |
|---|---|---|
| EP | 0 958 061 B1 | 7/2004 |
| WO | WO 01/20953 A1 | 3/2001 |

* cited by examiner

*Primary Examiner*—Kevin P Kerns
(74) *Attorney, Agent, or Firm*—Damian Porcari; Brooks Kushman P.C.

(57) ABSTRACT

A method for generating a variable flow of melted material is disclosed. The method includes providing first and second members having a potential energy difference between them. One or more members is extended at a first average extension rate for a first period while producing an electrical arc. One or more members is extended at a second average extension rate for a second period while producing an electrical arc. One or more members is extended at a third average extension rate for a third period while producing an electrical arc. A transport medium is flowed across one or more members during one or more of the extending steps.

17 Claims, 2 Drawing Sheets

METHOD FOR PRODUCING A VARIABLE FLOW OF MELTED MATERIAL AND ARTICLES THEREFROM

BACKGROUND OF THE INVENTION

1. Field of the Invention

One aspect of the present invention relates to a method of producing deposits on a surface.

2. Background Art

Spray-forming is one technique for producing prototype tooling, for example dies and molds. Other uses include application of protective coatings and repair of articles. A typical spray-forming technique includes the steps of (1) providing a substrate in the pattern to be produced, (2) spraying a melted material on to the substrate, (3) allowing the melted material to solidify into a deposit having the shape of the pattern, and (4) repeating steps (2) and (3) until sufficient solidified material has accumulated for the intended application.

These processes expose a substrate to significant inputs of heat that may damage substrates and surfaces susceptible to heat.

As a consequence, a conventional flame spray gun is typically held at least 150-mm to 200-mm from the substrate. Therefore, there is less control spatially of the spray, especially in tight corners, as well as less control of the side reactions and cooling in flight. The result of the variation of cooling in flight is a less homogeneous coating on the surface, and reduced efficiency of use of materials in the deposit.

A further consequence of the longer flight can be a greater propensity to generate oxides in the melted material through reaction with ambient air. When oxides are formed, the hardness of the surface increases because of the increased hardness of the oxide. However, the tensile strength of the resulting surface will typically be lower.

In light of the foregoing, what is needed is a method for generating fine particles of melted materials and applying them to a candidate substrate for heat damage without significantly degrading the applied material or the substrate.

What also is needed is a method that reduces the compromise between hardness of the surface due to particulate adjuvants, and the lower tensile strength of the coating due to the presence of oxides.

What is further needed is a method that provides improved spatial control, deposit efficiency, and materials property control of materials deposited on a surface of a substrate as well as reduced residual stress and relief of existing stress in substrates and material deposits.

SUMMARY OF THE INVENTION

At least one aspect of the present invention is a method for generating a flow of melted material in a Variable manner. The cold arc spraying process (CASP) method provides first and second members. The members have a potential energy difference between them, such as a cathode and an anode. One or more members extends at a first average extension rate producing an electrical arc to generate melted material at a first consumption rate of a member or members.

In one embodiment, an electrical arc dissipates. As the process repeats, one or more members extends again. An electrical arc is produced. In this embodiment, an extension rate is less than a consumption rate, and the electrical arc may again dissipate.

In another embodiment, in a next step one or more members extends again. An electrical arc is produced. In this embodiment, the extension rate is greater than or equal to the consumption rate by the electrical arc, yielding a variable flow of melted materials. In a next step, one or more members extends at a third extension rate while producing an electrical arc having a third consumption rate of one or more members. The third extension rate is less than the third consumption rate.

Another aspect of the present invention is a method of using CASP to deposit the melted material on a surface of a substrate in a variable flow, thereby remedying deficiencies in the current art such as allowing use of substrates which may be susceptible to heat damage, improving spatial accuracy and precision of the deposition of melted material, and/or mitigating the current art compromise between surface properties, such as hardness or lubricity, and reduced tensile strength of re-solidified melted material deposits. A relatively low temperatures associated with using CASP reduces the residual stress in and relief of existing residual stress in substrates and deposits.

An additional aspect of CASP is a method of depositing on a surface of a substrate using this method. This embodiment involves generating melted material, atomizing the melted material, directing it to the surface either by transport medium or under the influence of a field or a combination thereof, and depositing the melted material in such a way as to avoid degrading the substrate, the surface, or the re-solidified melted material deposit.

DETAILED DESCRIPTION

Figure 1A:
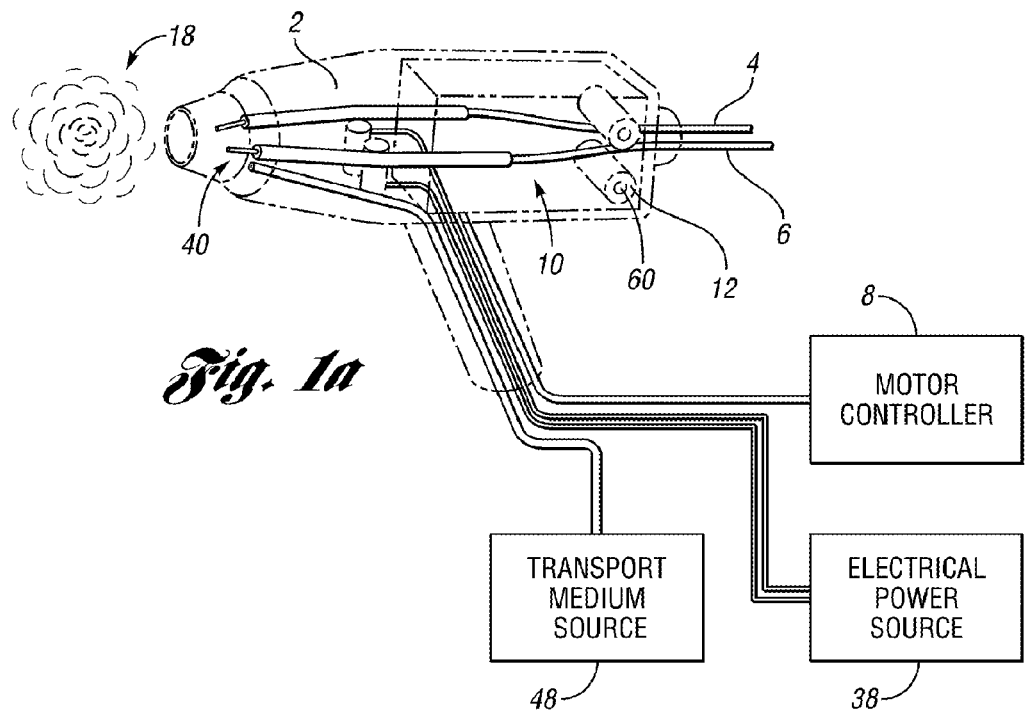
FIGS. 1$a$-1$e$ show a CASP sequence of a method for forming melted material according to one embodiment of the present invention.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

The description of a group or class of materials as suitable for a given purpose in connection with the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The CASP method uses an electrical arc spray gun, where at least one member, such as a cathode or an anode, can extend from a discharge point. In some embodiments a second member may also extend, may remain stationary, or may not be consumed by the arc. According to this embodiment, the cathode and anode have a potential energy difference between them, but are electrically isolated at a discharge point. A motor controller may be controlled according to an instruction set to advance a cathode and an anode by controlling a motor which drives feed wheels. When the cathode and anode extend from the discharge point, an electrical arc is produced through a transport medium separating the wires. This transport medium can be one or more propellant gases. An electrical arc may also be struck through this medium. This arc can melt a cathode and/or an anode, thereby generating melted materials.

Non-limiting examples of such instruction sets can be pre-programmed sequences selected by the user, responses to a feedback or a feedforward loop, a sensor or combinations thereof. An example of such a response may include a signal to end the first extension step which corresponds approximately with the amount of heat that has built up on a surface or in a substrate which may be a candidate for heat damage.

In one embodiment of the present invention, the instruction sets may instruct one or more members to extend at a first average extension rate that is greater than or equal to the average consumption rate by the electrical arc. In the next step, a second average extension rate goes to zero. Before, the third extension period begins, the electrical arc may dissipate. In certain cases, the third period may begin where the third extension rate is greater than or equal to the consumption rate of the electrical arc. In these cases, the electrical arc may not dissipate. However, the quantity of melted material flowing varies.

In another embodiment of the present invention, one or more members extends where a first average extension rate is greater than or equal to the average consumption rate by the electrical arc. In the next step, a second average extension rate slows, but is greater than or equal to the average consumption rate of the electrical arc. The third period may begin where the third extension rate is greater than or equal to the consumption rate of the electrical arc. In these cases, the electrical arc may not dissipate. However, the quantity of melted material flowing varies.

In another embodiment of the present invention, one or more members extend where a first average extension rate is greater than or equal to the average consumption rate by the electrical arc. In the next step, a second average extension rate slows to less than the consumption rate by the electrical arc. Before the third extension period begins, the electrical arc may dissipate. In certain cases, the third period may begin where the third extension rate is greater than or equal to the consumption rate of the electrical arc. In these cases, the electrical arc may not dissipate. However, the quantity of melted material flowing varies.

In another embodiment of the present invention, one or more members extends where a first average extension rate is less than the average consumption rate by the electrical arc. In the next step, a second average extension rate goes to zero. Before the third extension period begins, the electrical arc may dissipate. In certain cases, the third period may begin where the third extension rate is less than the consumption rate of the electrical arc. In these cases, the electrical arc may or may not dissipate during a particular period. If an electrical arc dissipates for a sufficiently long time period, the flow of melted material may become discontinuous.

In one embodiment, a substrate with a surface is placed in front of a CASP thermal spray gun. A melted material may be atomized by a transport medium. This transport medium may typically be co-linear with the first and second member extension direction, but may have a traverse component. Typical transport media are often similar to welding gas mixtures and may include, but are not limited to air, oxygen, noble gases, carbon dioxide, hydrogen, nitrogen, and combinations thereof. The transport medium may flow either continuously, at a variable rate, or in a discontinuous fashion. In certain embodiments, the transport medium may flow not directionally, but may merely be present and provide cooling while allowing the melted material to be directed and/or atomized through the action of a field on the melted material. Such a field may be gravity, centrifugal force, magnetic force, or electrical force. The atomized melted material deposits on the substrate surface and re-solidifies. The re-solidified melted material may remain on the surface, as in a repair, or may be removed, as in a die or mold, depending upon the application. The surface, the re-solidified melted material deposit, and/or the substrate may be monitored for temperature and may provide feedback or feedforward instruction sets to the motor controller instead of using an instruction set of a programmed sequence for the motor controller.

In certain embodiments of the present invention, a cathode or an anode may have a substantially continuous matrix of electrically conductive materials. In some examples, metal may be present in a sufficient quantity to enclose or embed dispersed finer particles while retaining a substantially continuous web of material. Non-limiting examples of electrically conductive materials include metallic materials, carbon fiber, graphite, metal coated fibers, and carbon black. Such materials may have different consistencies, for example, metals can be powders coated on pre-forms or can be formed shapes. These shapes can be tubes, braids, wires, dendrites, metal tubes packed with a powder core, and combinations thereof. The materials can be composed of pure metals; alloyed metals; bimetals; metal-reinforced composites; carbon fiber reinforced composites; cermets; as well as impure products such as materials containing separated slivers of conductive materials, and combinations thereof. Some of the materials in a formed shape may not be meltable or electrically conductive. Some of the material may be converted to a gas or remain a solid when exposed to the electrical arc. Some of the melted or gasified material may react with other components of the melted material, gasified products, and transport medium stream or with the ambient environment during the transit from the electrical arc to the substrate. In certain applications, all of the feedstock material may not end up deposited on the substrate surface.

Production of an electrical arc and its consumption rate of cathode and/or anode vary based on one or more parameters. Non-limiting examples of these parameters include the material in the cathode or anode, the potential between them, the transport medium pressure, the transport medium material selection which controls, in part, the energy necessary to ionize the transport medium, other environmental factors, and combinations thereof. A time that a current flows in an electrical arc may not necessarily be the same as an extension time. Times for a period of extension having the motor controller energized can be greater than about 0.01, 0.05, 0.1, 0.5, or 1 seconds and less than about 2, 2.5, 5.0, 7.5, or 10 seconds. A time for a period of extension may also have to include additional considerations. An example may include a lag in the drive system. An example is the typical lag associated with gear lash. Another consideration may be a wait period. As a non-limiting example, a time between a dissipation of the electrical arc and a next extension step, may be determined by task specifications. Examples of task specifications can include desired heat dissipation on a surface and substrate, repositioning the electrical arc spray gun for different spatial coverage or re-directing transport media to tailor re-solidified melted material deposit build-up thickness on a surface.

An average extension rate for each member may be equal to or greater than 50 mm/minute, 75 mm/minute, 100 mm/minute, 125 mm/minute, 150 mm/minute, or 200 mm/minute; and equal to or less than 12,000 mm/minute, 10,000 mm/minute, 5,000 mm/minute, 1,000 mm/minute, or 500 mm/minute. An average extension rate may be expressed as an average for a relatively short duration. A non-limiting example may be an average of instantaneous extension rates for a single extension period.

An extension rate may be a proxy for an amount of material deposited or consumed. Factors affecting the selection of an extension rate include, but are not limited to, the diameter of a member, the number of members, and the density of a member. The rate of material deposited by each member may be greater than or equal to 0.05 kg/hr, 0.15 kg/hr, 0.25 kg/hr, 0.5 kg/hr, 1 kg/hr, or 5 kg/hr and less than 100 kg/hr, 75 kg/hr, 50 kg/hr, 40 kg/hr, or 30 kg/hr. Consumption may not be equivalent to deposition having to factor in efficiency of the deposition.

A substrate may be monolithic or formed of various components. One or more of these substrate components may be susceptible to damage by excessive heat. The substrate may have components with properties such as melting or re-crystallizing temperatures of less than 400° C., 350° C., 300° C., 250° C., 200° C., 150° C., 100° C., or less than 100° C. Other indicators of substrate susceptible to heat damage may be having a service temperature of less than 350° C., 300° C., 250° C., 200° C., 150° C., 100° C., or less than 50° C.; or a material that experiences a glass transition temperature of less than 200° C., 150° C., 100° C., or less than 50° C.

Substrates may also be considered susceptible to heat damage if they or the deposit have a coefficient of linear thermal expansion greater than about $10 \times 10^{-6}/° C.$, $15 \times 10^{-6}/° C.$, $20 \times 10^{-6}/° C.$, $50 \times 10^{-6}/° C.$, $10 \times 10^{-5}/° C.$, or $10 \times 10^{-4}/° C.$ Differential expansion rates between substrate and deposit may result in incorrect dimensions or failures due to shear stresses. Substrates may further be considered susceptible to heat damage if they have a chemical decomposition temperature of less than 400° C., 350° C., 300° C., 250° C., or less than 250° C. Decomposition may be considered an example of reactions where the material or bonds within the material chemically cleave. Other examples of chemical reactions where cleavage may occur are reactions such as combustion, dehydration, decarboxylation, pyrolysis, or oxidation.

Substrates which are susceptible to heat damage may include those for making prototype molds and dies, as well as articles requiring repair or protective coatings because they may melt or may be thermally degraded by exposure to high temperatures. In addition, differences in thermal expansion between substrate and applied melted material may cause residual stresses in the articles or the re-solidified melted material, warped articles, and fractures from thermal shock. Examples of these substrate components that may be susceptible to heat damage include epoxy tools, silicone molds, tooling boards, modeling boards, foam boards, boards that have cooling line components, medium density fiberboards, fiber laminates, pattern lumber, machinable wax, thin shell tooling, nickel shell tooling, laser-engraved printing rolls, engine bores for coating, and various materials used for rapid prototyping, such as laser-light-cured resins, laminated paper, wax, wood, foamed polymers, and sintered ceramics.

substrate susceptible to heat damage may also be a thin shell. A typical thin shell may be less than 25-mm, 20-mm, 15-mm, 10-mm, 5-mm, 4-mm, 3-mm, 2-mm or even less than 1-mm thick. Repair or preparation of these thin shells, as a non-limiting example a nickel shell tool made by an electroless nickel or chemical vapor deposition process, may be damaged by changes in residual stress during conventional relatively high temperature operations. A conventional thin shell tool may also lose shape or dimension due to relief of residual stresses during conventional relatively high temperature operations, but may additionally experience relatively increased oxidation. This oxidation requires removal by post-treatment.

A substrate susceptible to heat damage may also be a material containing significant residual stresses. When exposed to heat of more than 50° C., 100° C., 150° C., or 200° C. and less than 400° C., 350° C., 300° C., or 250° C. these residual stresses may be released fully or partially. The result may be a dimensional distortion or warping of the substrates that may be susceptible to heat damage.

Referring to FIG. 1A shows a step where an electrical arc thermal spray gun 2 having a cathode 4 and an anode 6 fed by a motor controller 8 which may electrically or wirelessly connected to a motor 10. Members such as cathode 4 and anode 6 may be unextended from a discharge point 40. Cathode 4 and anode 6 can be extended by a motor 10 which could be connected by a shaft 60 to drive wheels 12. In this example, the drive wheels 12 extend the cathode 4 and anode 6. In certain embodiments, cathode 4 and an anode 6 can be extended by a plurality of drive wheels which could be used either in contact with both the cathode and the anode together or separately. Other examples of electromechanical extension devices include a plurality of cathodes and anodes with a plurality of drive wheels, motors, motor shafts, and motor controllers. The electromechanical extension device may also include clutch mechanisms between the motor controller and the drive wheels, linear motors to push the wire, or Geneva gears that allow continuous or intermittent feeding of the wire.

Figure 1B:
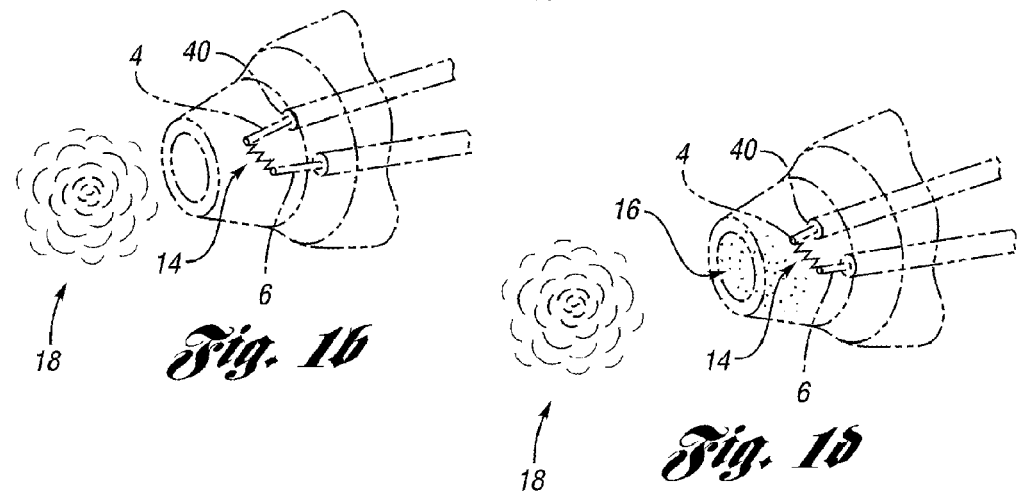
Figure 1D:
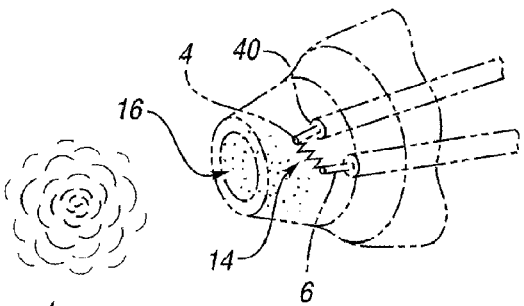
Figure 1C:
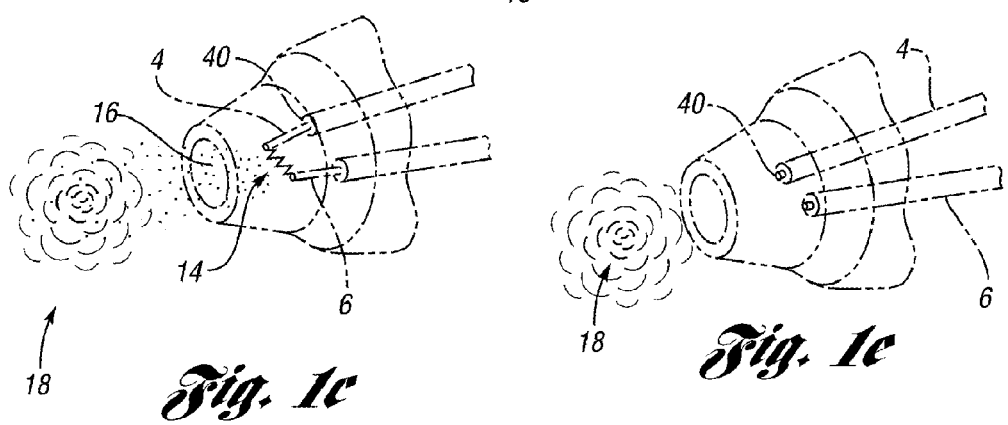
Figure 1E:
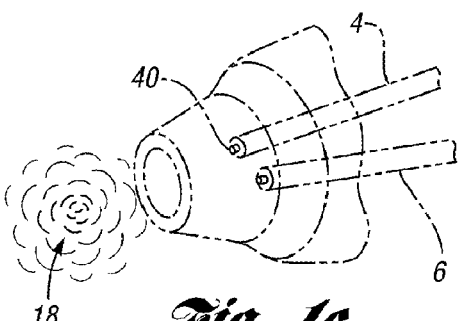

Electrical arc thermal spray gun 2 is connected to an electrical power source 38 which applies the potential energy difference between the cathode 4 and anode 6. A transport medium 18 is supplied by a transport medium source 48. In FIG. 1B, a motor controller 8 may signal a motor 10 to extend a cathode 4 and an anode 6 by turning the drive wheels 12. An electrical arc 14 may be formed between cathode 4 and anode 6. In FIG. 1C, an electrical arc 14 melts cathode 4 and anode 6 and generates melted material 16. In FIG. 1D, a mechanism for extending a cathode 4 and an anode 6 ceases to extend a cathode 4 and an anode 6. An example may be a motor controller 8 that could signal a motor 10 to cease extending cathode 4 and anode 6 by ceasing to turn drive wheels 12. In this example, an electrical arc 14 should continue to consume a cathode 4 and an anode 6 until it reaches the approximate discharge point 40 of the electrical arc thermal spray gun 2 where the electrical arc 14 may dissipate, but the transport medium continues, as in FIG. 1E.

Figure 2:
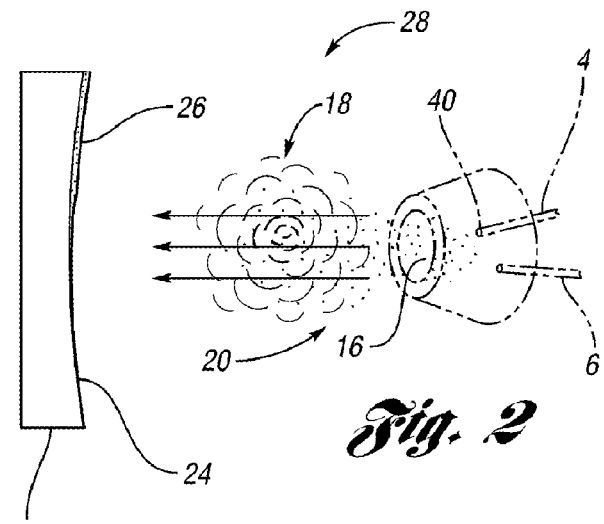
FIG. 2 shows an example of deposition of atomized melted material onto a surface of a substrate according to one embodiment of the present invention.

With reference to FIG. 2, melted material 16 may be atomized by a transport medium 18, which should create atomized melted material 20 and which may be transported toward the substrate 22 comprised of components with an adjoining surface 24 on which a deposit 26 of material may be made. The atomized melted material 20 should re-solidify as a deposit 26 on a surface 24 of a substrate 22 and could transfer some heat to a surface 24, to other re-solidified melted material already on the surface 24, to the substrate 22, or to the surrounding environment 28.

Figure 3:
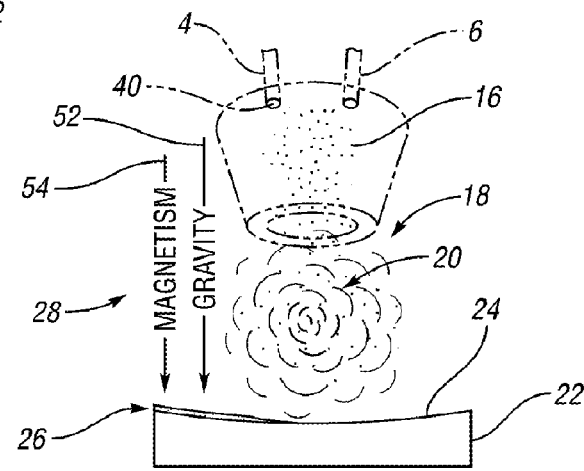
FIG. 3 shows an example of deposition of atomized melted material onto a surface of a substrate according to another embodiment of the present invention.

With reference to FIG. 3, melted material 16 may be surrounded and partially atomized by a transport medium 18, which generates partially atomized melted material 20 and which may be transported toward the substrate 22 with an adjoining surface 24 on which a deposit 26 of material may be made. The transportation forces may be a combination of fields such as gravity 52 and magnetism 54 or a mechanical force such as transport medium 18. The atomized melted material 20 should re-solidify on a surface 24 of a substrate 22 and could transfer some heat to a surface 24, to other re-solidified melted material deposit already on the surface 24, to the substrate 22, or to the surrounding environment 28. Atomization may include processes that subdivide melted material droplets and do not necessarily require that melted material exist as isolated single molecules or atoms or even small clusters of same.

Figure 4:
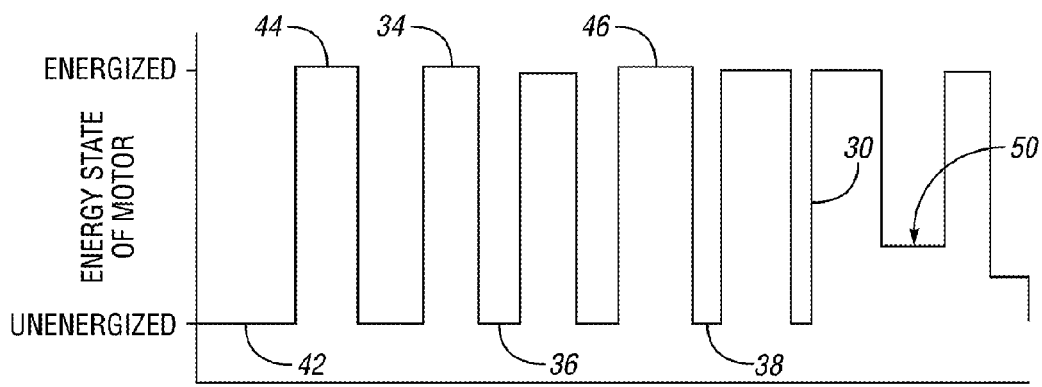
FIG. 4 shows an example of an instruction set of a predetermined wire feed signal sequence to actuate a motor connected to a drive wheel touching a cathode and an anode by energizing and/or unenergizing a motor controller according to one embodiment of the present invention.

FIG. 4 is an example of a programmed sequence of energy state 30 versus time 32 for the motor 10 in response to instruction sets from the motor controller 8. The motor energy state is either energized 34 or unenergized 36. When the current is on 34, the motor 10 may turn the drive wheels 12 which in turn should extend the cathode 4 and anode 6. When the current is unenergized 36, the motor 10 should stop turning appropriate drive wheels 12. As a consequence, a cathode 4 and an anode 6 should stop extending. In certain instances the time periods where the motor may be unenergized 36, which may correspond to a second period and may not be uniform in duration as shown in unenergized time periods 38 and 42. In certain instances, the time period where the motor may be energized 34 may correspond to a feedback signal and may not be uniform in duration as shown in energized time periods 44 and 46. As a non-limiting example, the motor controller could receive inputs from signal sources such as feedback or feed-forward loops from sensors, examples of which may be temperature sensors in the substrate, strain gauges on the surface, or a wireless infrared temperature probe. The output of the motor controller need not be a pre-programmed sequence signal, but may include other types of control methods such as fuzzy logic and inputs from feedback loops such as a Proportional-Integral-Derivative device. In addition, the motor energy state may not be completely unenergized. Energy can be applied to the motor at an energy state 50 so that the motor will extend at least a first member at an average rate slower than the consumption of the member by the electrical arc.

EXAMPLE 1

Example 1 is an example of variable processes which shows interrupted extensions in time. The electrical arc thermal spray gun extends both a cathode of stainless steel wire and an anode of stainless steel wire. The cathode and anode are angled slightly toward each other. The motor controller is programmed with a cycle of about 0.3 seconds energized where the cathode and anode extend using a pull-type of wire feed feeding from an electrically isolated single drive wheel set. The cathode and anode extend sufficiently far that the gap between them is sufficiently small to allow the production of an electrical arc. The arc is produced and a current is flowing through the established arc. The average extension rates of the cathode and anode are less than the average consumption rate of the cathode and anode by the electrical arc. The electrical arc dissipates. This is followed by a period of about 0.1 second having reduced energy state of the motor controller. Non-limiting examples of a reduced energy state may be ones yielding a slower extension rate or a standby mode. In this reduced energy state for the motor controller the cathode and anode may extend at a rate slower than the consumption rate of the cathode and anode by the electrical arc. They continue to extend until the gap between them is sufficiently small that the arc is again produced. The result is a variable flow of melted material.

In this example, the transport medium is nitrogen derived from vaporized liquid nitrogen and the electrical arc uses voltage of about 33 volts with a current of about 10-15 amperes. In this example, stainless steel wire is melted into droplets. The stainless steel is altered from a solid to a liquid state by heat. The droplets are atomized by the nitrogen transport medium, and deposit on the surface of a wax substrate.

EXAMPLE 2

Example 2 is an example of variable processes which shows pulsed extensions in time. The electrical arc thermal spray gun extends both a cathode of stainless steel wire and an anode of stainless steel wire. The cathode and anode are angled slightly toward each other. The motor controller is programmed with a cycle of about 0.3 seconds energized where the cathode and anode extend using a pull-type of wire feed feeding from an electrically isolated single drive wheel set. The cathode and anode extend sufficiently far that the gap between them is sufficiently small to allow the production of an electrical arc. The arc is produced and a current is flowing through the established arc. The average extension rates of the cathode and anode are less than the average consumption rate of the cathode and anode by the electrical arc. Before the electrical arc dissipates, the motor controller receives a signal that the surface temperature has cooled sufficiently. The motor controller signals the motor to increase the speed of the drive wheels. The extension rate of the cathode and anode are as great or greater than the consumption rate by the arc. The result is a pulse of melted material. The material is subsequently transported to the surface as in Example 1.

EXAMPLE 3

In example 3, a method is followed as in example 1, but is used to deposit melted material to a heat-sensitive polymer mandrel. The polymer mandrel such as REN board available from Huntsman is machined in the negative of the desired shape. Certain aspects of the CASP method have the additional advantage that these mandrels may be produced in complicated shapes and still receive deposits. The CASP deposition may be executed by electrical arc thermal spray guns located on robotic arms. The stainless steel is deposited as in example 1. A backing material may be applied to the deposited stainless steel. The backing material and the stainless steel deposit are removed from the mandrel. The result is a unit of backing material and stainless steel deposit which could be available for use as stamping dies.

EXAMPLE 4

In example 4, a deposit is made onto a thin shell with an epoxy backing. The wire feed rate is 3-20 inches per minute. The transport medium is air at 80 pounds per square inch. The potential between a consumable cathode and a consumable anode is 33 V. The temperature of the transport medium near the substrate is less than 100° C. and likely to be less than 75° C., 50° C., or even 30° C.

EXAMPLE 5

The method of the present invention may be used routinely at 50-mm distance from the surface of the substrate. In micrographs, the deposition by the method of the present invention shows as good or better homogeneity than the conventional electrical arc spray at 200-mm distance from the surface of the substrate.

EXAMPLE 6

This example shows an embodiment for using substrate comprised of components some of which are susceptible to heat damage. Examples of substrate components susceptible to heat damage in this embodiment include low melting adhesives, a foamed plastic model board, and plastic articles, such as stereolithographically produced resin models or sculpted expanded polystyrene foam. In the cold arc spraying process details such as cooling lines may be adhered to a base using a low temperature adhesive, for example a polyethylene hot melt adhesive. Likewise the cooling lines may be constructed as a part of the rapid prototype model.

While the best mode for carrying out the invention has been described in detail, those familiar with the art to which this invention relates will recognize various alternative designs and embodiments for practicing the invention as defined by the following claims.

What is claimed is:

1. A method for generating a variable flow of melted material, the method comprising:
   (a) providing first and second members, the members having a potential energy difference between them, and the first and second members including first and second consumable ends, respectively;
   (b) extending the first member at a first average extension rate for a first period, and extending the second member during at least a portion of the first period while producing an electrical arc between the first and second members to consume the first and second consumable ends followed by producing a sufficient gap between the first and second consumable ends to allow for dissipation of the electrical arc;
   (c) extending one or more of the first and second members at a second average extension rate for a second period while producing the electrical arc followed by dissipation of the electrical arc; and
   (d) flowing a transport medium in contact with the first and second members during the extending step (b), subsequent to extending step (b) and during extending step (c).

2. The method of claim 1, wherein one or more of the first or second average extension rates is less than an average consumption rate of the first or second member by the electrical arc.

3. The method of claim 1, wherein the second member is stationary during a portion of the first or second period.

4. The method of claim 1, wherein one or more of the first or second average extension rates is greater than or equal to an average consumption rate of the first or second member by the electrical arc.

5. The method according to claim 1, wherein the first average extension rate is controlled by an electromechanical extension device.

6. The method according to claim 1, wherein the first average extension rate is based on an instruction set.

7. The method according to claim 1, wherein the one or more members are electrically conductive materials.

8. The method according to claim 7, wherein the one or more members are stainless steel.

9. The method according to claim 7, wherein the electrically conductive materials include a powder containing particulate adjuvants.

10. The method according to claim 1, wherein the average second extension rate is in the range of 50 mm/minute to 12,000 mm/minute.

11. The method of claim 1, further comprising:
    atomizing the variable flow of melted material; and
    depositing with substantially no melting of a substrate by the atomized variable flow of material, the substrate having a re-crystallizing temperature in the range of 100°-250° C.

12. A method for depositing on a surface, the method comprising:
    (a) creating a variable flow of melted material by providing first and second members, the members having a potential energy difference between them, and the first and second members including first and second consumable ends, respectively;
    (b) extending the first member at a first average extension rate for a first period and extending the second member during at least a portion of the first period while producing an electrical arc to generate melted material and to consume a portion of the first member at a first average consumption rate, the first average extension rate being less than the first average consumption rate such that dissipation of the electrical arc occurs;
    (c) flowing a transport medium in contact with the first and second members during extension step (b);
    (d) atomizing the variable flow of melted material; and
    (e) directing the variable flow to the surface of a substrate.

13. The method according to claim 12, wherein the substrate is susceptible to heat damage, the substrate having a melting temperature of less than 400° C.

14. The method according to claim 12, wherein the directing step (e) is aided by the transport medium, an influence of a field, or a combination thereof.

15. A method for generating a variable flow of melted material from first and second wires, the method comprising:
    (a) providing first and second wires having a potential energy difference between them, the first and second wires having first and second consumable ends, respectively;
    (b) extending the first and second wires while generating an electrical arc between the first and second wires so as to consume the first and second consumable ends to produce melted material during a first extension period;
    (c) adjusting the average extension rate of the first wire relative to the average extension rate of the second wire such that a sufficient gap is produced between the first and second consumable ends to allow the electrical arc to dissipate and to produce melted material during a dissipation period;
    (d) subsequent to the adjusting step (c), readjusting the average extension rate of the first wire relative to the average extension rate of the second wire such that a sufficient proximity is produced between the first and second consumable ends to allow the electrical arc to regenerate so as to consume the first and second consumable ends to produce melted material during a second extension period; and (e) contacting the first and second wires with a transport medium during the first extension period, the dissipation period and the second extension period to transport the melted material away from the first and second consumable ends.

16. The method of claim 15, wherein the first consumable end is consumed at a first average consumption rate, and the step of adjusting the average extension rate of the first wire relative to the average extension rate of the second wire includes adjusting based at least partially on the first average consumption rate.

17. The method of claim 15, wherein the contacting step (e) includes continuously contacting the first and second wires with a transport medium between the first extension period and the second extension period.

* * * * *

UNITED STATES PATENT AND TRADEMARK OFFICE
CERTIFICATE OF CORRECTION

PATENT NO. : 7,582,843 B2 Page 1 of 1
APPLICATION NO. : 11/162508
DATED : September 1, 2009
INVENTOR(S) : Collins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 239 days.

Signed and Sealed this

Fourteenth Day of September, 2010

David J. Kappos
*Director of the United States Patent and Trademark Office*